(12) United States Patent
Li

(10) Patent No.: US 9,611,928 B2
(45) Date of Patent: Apr. 4, 2017

(54) UNIDIRECTIONAL COUPLING DAMPING PULLEY

(71) Applicant: Zhimin Li, Yuhuan County (CN)

(72) Inventor: Zhimin Li, Yuhuan County (CN)

( * ) Notice: Subject to any disclaimer, the term of this patent is extended or adjusted under 35 U.S.C. 154(b) by 197 days.

(21) Appl. No.: 14/413,440

(22) PCT Filed: Aug. 22, 2013

(86) PCT No.: PCT/CN2013/082085
§ 371 (c)(1),
(2) Date: Jan. 8, 2015

(87) PCT Pub. No.: WO2014/198086
PCT Pub. Date: Dec. 18, 2014

(65) Prior Publication Data
US 2015/0167816 A1    Jun. 18, 2015

(30) Foreign Application Priority Data

Jun. 13, 2013  (CN) .......................... 2013 1 0236346
Jul. 15, 2013  (CN) .......................... 2013 1 0299286

(51) Int. Cl.
*F16H 55/36* (2006.01)

(52) U.S. Cl.
CPC ....... *F16H 55/36* (2013.01); *F16H 2055/366* (2013.01)

(58) Field of Classification Search
CPC .. F16H 55/36; F16H 2055/366; F16D 41/206; F16D 7/022
See application file for complete search history.

(56) References Cited

U.S. PATENT DOCUMENTS 6,083,130 A     7/2000  Mevissen et al.
8,678,157 B2 *  3/2014  Ward ...................... F16D 7/022
                                                    192/41 R
(Continued)

FOREIGN PATENT DOCUMENTS

CN    200880128290.0    3/2008
CN    201020519051.2    9/2010
(Continued)

OTHER PUBLICATIONS

International Search Report issued in PCT/CN2013/082085, mailed on Mar. 20, 2014 (6 pages).
(Continued)

*Primary Examiner* — William E Dondero
*Assistant Examiner* — Robert T Reese
(74) *Attorney, Agent, or Firm* — Liang Legal Group, PLLC

(57) ABSTRACT

A unidirectional coupling damping pulley includes a threaded central spindle extending into a pulley hub, a friction stopper ring and a positioning sleeve pressed against the inner wall of the pulley hub, a protruding ring formed on the outer diameter of the central spindle, in which the central spindle is sleeved with a damping washer forming a step on one side of the damping washer, the central spindle is sleeved with a damping spring, the damping washer is sleeved and in rotation fit with a friction sliding ring, a friction spring is sleeved around the damping spring, the friction spring locks up with the friction stopper ring and the friction sliding ring through friction, and the friction spring can be separated from the friction stopper ring and the friction sliding ring alternately.

13 Claims, 13 Drawing Sheets

(56) References Cited

U.S. PATENT DOCUMENTS

| | | | |
|---|---|---|---|
| 2004/0014540 A1* | 1/2004 | Dell | F16H 55/36 |
| | | | 474/70 |
| 2005/0250607 A1* | 11/2005 | Jansen | F02B 67/06 |
| | | | 474/74 |
| 2007/0240964 A1 | 10/2007 | Saito et al. | |
| 2012/0298474 A1* | 11/2012 | Ward | F16D 7/022 |
| | | | 192/41 S |
| 2013/0217524 A1* | 8/2013 | Antchak | F02B 67/06 |
| | | | 474/94 |

FOREIGN PATENT DOCUMENTS

| | | |
|---|---|---|
| CN | 101936348 A | 1/2011 |
| CN | 102817936 A | 12/2012 |
| CN | 203363075 U | 12/2013 |
| CN | 203413096 U | 1/2014 |
| JP | 2008-232329 A | 10/2008 |
| WO | 2012/162280 A1 | 11/2012 |

OTHER PUBLICATIONS

Written Opinion issued in PCT/CN2013/082085, mailed on Mar. 20, 2014 (5 pages).

\* cited by examiner

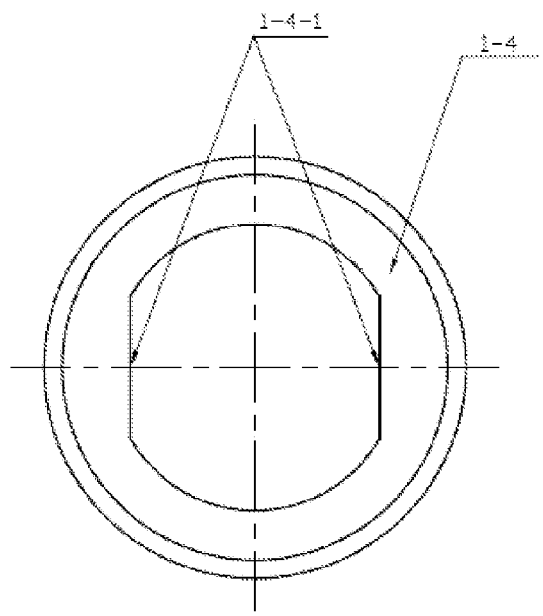
FIG. 12
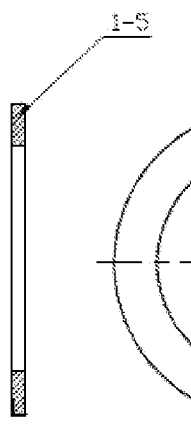
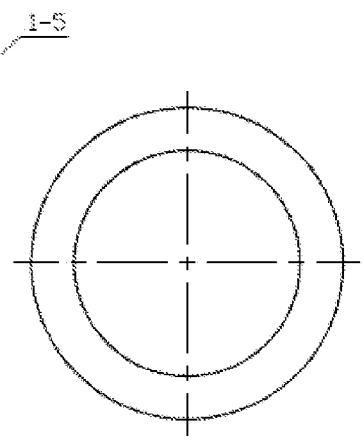
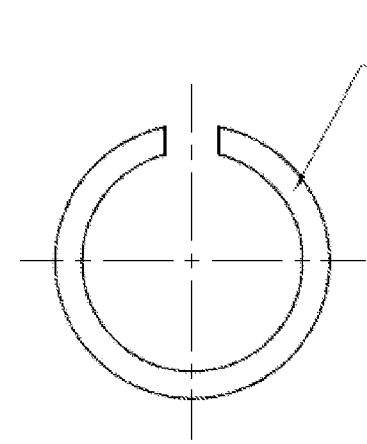
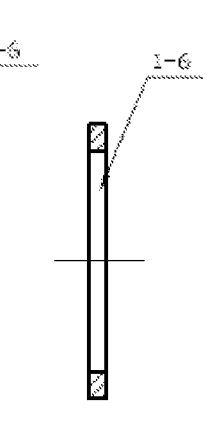
FIG. 13  FIG. 14  FIG. 15  FIG. 16

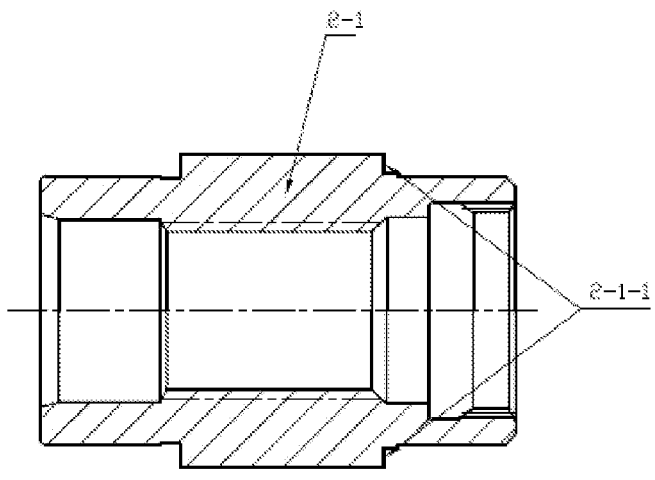
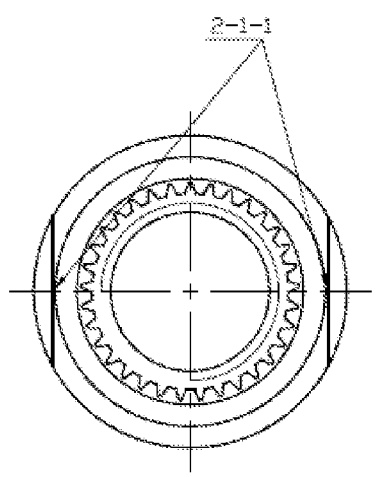
FIG. 24      FIG. 25
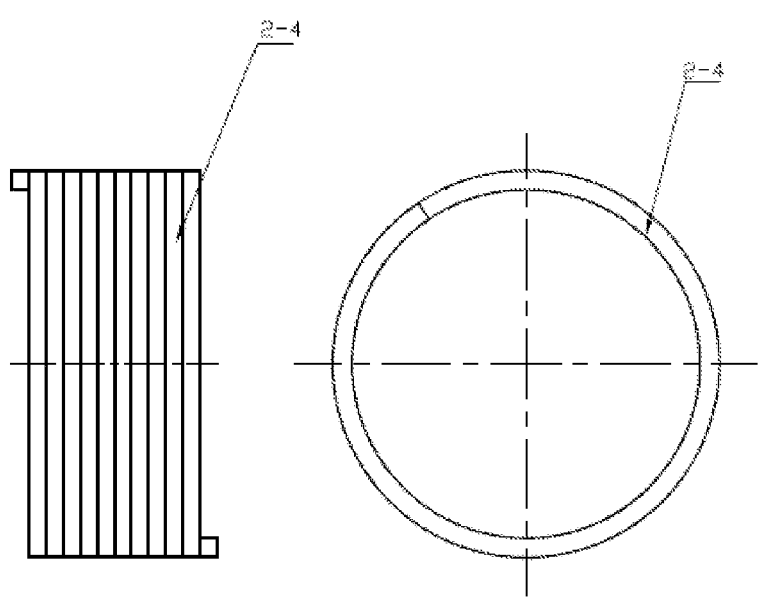
FIG. 26      FIG. 27      FIG. 28

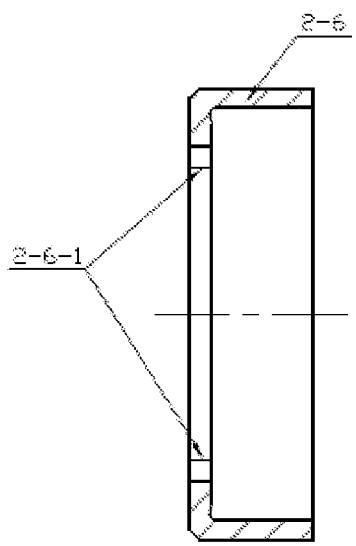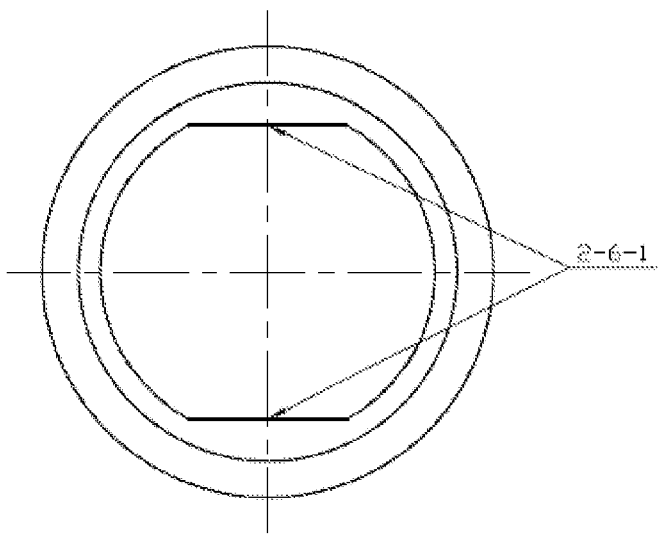
FIG. 29                FIG. 30
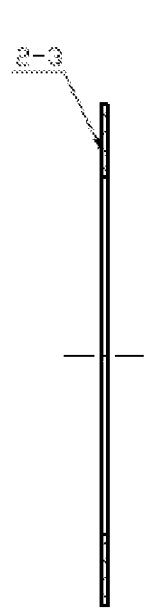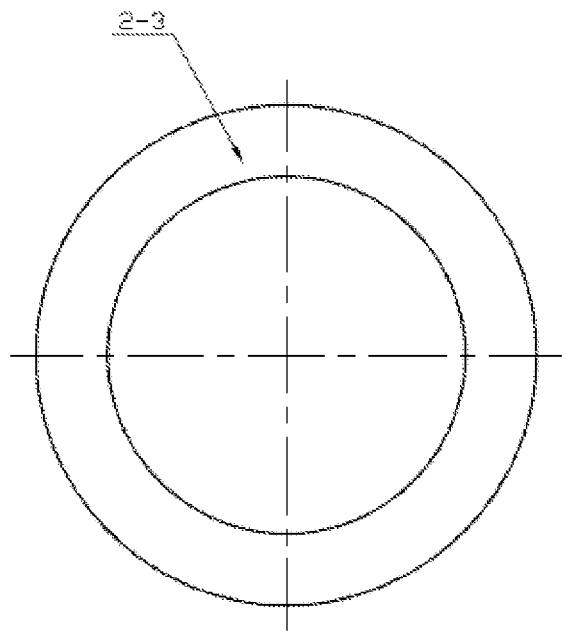
FIG. 31                FIG. 32

UNIDIRECTIONAL COUPLING DAMPING PULLEY

CROSS REFERENCE TO RELATED APPLICATIONS

This is a national stage application based on PCT/CN2013/082085, filed on Aug. 22, 2013, which claims priority to Chinese Patent Application No. 201310236346.7, filed on Jun. 13, 2013 and Chinese Patent Application No. 201310299286.3, filed on Jul. 15, 2013. This application claims the benefits and priority of these prior applications and incorporates their disclosures by reference in their entireties.

TECHNICAL FIELD

The present invention relates to the technical field of the manufacture of unidirectional coupling damping pulley used for automobile generators, particularly a unidirectional coupling damping mechanism using spring friction for braking, specifically a unidirectional coupling damping pulley using spring friction for braking.

BACKGROUND

Unidirectional clutch pulleys of automobile alternators (generators) have been widely used in some high-end automobiles all over the world. When a generator is driven by a crankshaft of an automotive engine via a belt, a pulley unit, etc., excessive torque and tension may be exerted on the pulley, the rotating shaft (the axle) and the pulley as a result of cycling of induction, compression, combustion and expansion, and exhaust strokes. When the rotation of the crankshaft suddenly decelerates, since the rotating shaft of the generator has a large inertia, the belt is pulled in the direction of torque rotation producing a change in the tension, which may result in overload of the belt and thereby shortening its service life.

In the prior art, there is an OAD (overrunning alternator decoupler) spring friction unidirectional coupling damping generator (alternator) pulley, which can reduce the above-described overload produced in the belt by the change in rotation by using spring friction unidirectional coupling to interrupt the power or by deforming a torsion coil spring in an elastic fashion to change the torque, as disclosed in Chinese patent applications No. 200880128290.0 and No. 201020519051.2. It can filter both high speed and low speed vibrations. However, at present, an OAD with such a structure has the following technical problems: 1. one end of the friction spring is fixed on a retainer, which presses said end of the friction spring into a straight section so that a bending point forms between the straight section and the coil section of the spring. Frictional force will focus on this bending point. When friction clutching occurs in the generator due to high and low speed rotations, the bending point at the end of the friction spring, where it is fixed to the retainer, is prone to breakage. 2. In addition, the bending point and the outer circular surface of the friction spring are both used in braking and overrunning to generate friction with the inner diameter of the pulley hub. This not only results in short service life, but also requires complex manufacture process and high costs.

SUMMARY OF THE INVENTION

The present invention discloses unidirectional coupling damping pulleys that use spring friction for braking. These pulleys solve the above-described technical problems associated with the above-mentioned unidirectional clutch pulleys.

The present invention uses the following technical solutions to solve the technical problems: a unidirectional coupling damping pulley using spring friction for braking, comprising a threaded core shaft, a damping spring, a friction spring, a friction stopper ring, a friction sliding ring, a damping washer, ball bearings, a positioning sleeve and a pulley hub; wherein the threaded core shaft extends into the pulley hub; the two ends of the threaded core shaft and the pulley hub are respectively provided with a ball bearing; the friction stopper ring and the positioning sleeve are pressed against the inner wall of the pulley hub; a protruding ring is formed on the outer diameter of the threaded core shaft, and a step is formed on a side of the protruding ring toward the other side of the threaded core shaft; the other side of the threaded core shaft opposite the protruding ring is sleeved with the damping washer, and a step is formed on the damping washer; the threaded core shaft is sleeved with the damping spring; a first end of the damping spring abuts the protruding ring of the threaded core shaft, and the end surface of said end of the damping spring abuts the step of the protruding ring; a second end of the damping spring abuts the damping washer, and the end surface of said end of the damping spring abuts the step of the damping washer; the damping washer is sleeved with the friction sliding ring and can rotate synchronously with the friction sliding ring; the friction spring is sleeved around the damping spring; one end of the outer diameter of the friction spring is arranged in an inner bore of the friction sliding ring, and the other end of the outer diameter of the friction spring is arranged in the friction stopper ring; the outer wall of the friction sliding ring is in clearance fit with the positioning sleeve; both the inner diameter of the friction stopper ring and the inner diameter of the friction sliding ring are smaller than the outer diameter of the friction spring, increasing the elastic tension of the friction spring; the friction spring locks up with the friction stopper ring and the friction sliding ring through friction, and the friction spring can be separated from the friction stopper ring and the friction sliding ring alternately.

Preferably, the side surface of the protruding ring of the threaded core shaft that abuts the damping spring is a helicoid.

Preferably, the side surface of the damping washer that abuts damping spring is a helicoid.

Preferably, a circle of groove is formed on the threaded core shaft; the threaded core shaft is sleeved with a washer that is disposed on the outer side surfaces of the damping washer and the friction sliding ring; a square wire snap ring is provided on the outer side surface of the washer, and the inner diameter of the square wire snap ring clamps into the groove of the threaded core shaft.

Preferably, corresponding planes, which fit together, are respectively formed on the outer diameter of the damping washer and on the inner wall of the friction sliding ring so as to enable synchronous rotation.

Preferably, an anterior retaining ring is provided on the outer side surface of the friction stopper ring; the inner diameter of the anterior retaining ring is in clearance fit with the outer diameter of the protruding ring of the threaded core shaft, and the anterior retaining ring is pressed against the inner wall of the pulley hub.

Preferably, a posterior retaining ring is provided on the outer side surface of the positioning sleeve; the inner diameter of the posterior retaining ring is in clearance fit with the outer diameter of the washer, and the posterior retaining ring is pressed against the inner wall of the pulley hub.

Preferably, the outer side surfaces of the ball bearings are respectively provided with a dust-proof washer; the dust-proof washer is in clearance fit with the outer diameter of the threaded core shaft, and the dust-proof washer is pressed against the inner wall of the pulley hub.

Preferably, the cross-section of the damping spring is square; that is, the damping spring is formed by winding square spring steel wire.

A second technical solution disclosed in the present invention is as follows: a unidirectional pulley using spring friction for clutch, comprising a threaded core shaft, ball bearings, a friction spring, a friction stopper ring, a friction sliding ring, a positioning sleeve and a pulley hub; the threaded core shaft extends into the pulley hub; the two ends of the threaded core shaft and the pulley hub are, respectively, provided with a ball bearing, and the friction stopper ring is in the shape of a circular ring; a portion of the friction sliding ring is in the shape of a circular ring, the other portion of the friction sliding ring is bent inwards by 90 degrees and provided with a through bore, and the threaded core shaft is inserted through the through bore and is connected with the through bore in a fixed relative position manner; the threaded core shaft is sleeved with the friction spring, and a clearance is reserved between the threaded core shaft and the fiction spring; one end of the friction spring is arranged in an inner bore in the annular portion of the friction sliding ring, and the other end of the friction spring is arranged in an inner bore of the friction stopper ring; both the inner diameter of the friction stopper ring and the inner diameter of the friction sliding ring are smaller than the outer diameter of the friction spring; the outer circle of the friction stopper ring is fixedly connected with the inner wall of the pulley hub; the outer circle of the friction sliding ring is in clearance fit with the positioning sleeve, and the outer circle of the positioning sleeve is fixedly connected with the inner wall of the pulley hub.

Preferably, two opposite planes are formed on the inner wall of the through bore of the friction sliding ring; correspondingly, two planes are formed on the outer wall of the threaded core shaft; the friction sliding ring and the threaded core shaft are connected in a fixed relative position manner through the fitting of the corresponding planes.

Preferably, a step is formed on the outer wall of the threaded core shaft, and the inside of the friction sliding ring abuts said step; a positioning washer is arranged on the threaded core shaft, and the positioning washer positions the outside of the friction sliding ring on the threaded core shaft in the transverse direction.

Preferably, the inner side surfaces of the ball bearings is provided with a retaining ring; a clearance is reserved between the inner diameter of the retaining ring and the outer periphery of the threaded core shaft, and the outer diameter of the retaining ring is fixedly connected with the inner wall of the pulley hub.

Preferably, the outer side surfaces of the ball bearings is provided with a dust-proof washer; the outer periphery of the dust-proof washer is pressed against the inner circle of the pulley hub, and the inner circle of the dust-proof washer is in clearance fit with the outer circle of the threaded core shaft.

Preferably, the outer side surfaces of the ball bearings is provided with a dust-proof washer; the outer periphery of the dust-proof washer is in rotation fit with the inner circle of the pulley hub, and the inner circle of the dust-proof washer is in close fit with the outer circle of the threaded core shaft.

Preferably, a high and low temperature grease is provided to the friction spring.

The unidirectional coupling damping pulley using spring friction for braking disclosed in the present invention has advantages, such as reliability of power transmission, long service lives, simplicity of structure, low cost of manufacture, and easy manufacture of the damping spring.

BRIEF DESCRIPTION OF THE DRAWINGS

FIG. 12 is a left side view of FIG. 11.

FIG. 13 shows a schematic of a washer.

FIG. 14 is a left side view of FIG. 13.

FIG. 15 shows a schematic of a square wire snap ring.

FIG. 16 is a left side view of FIG. 15.

In FIGS. 1-19: 1-1, threaded core shaft; 1-2, damping spring; 1-3, damping washer; 1-4, friction sliding ring; 1-5, washer; 1-6, square wire snap ring; 1-7, friction spring; 1-8, friction stopper ring; 1-9, anterior retaining ring; 1-10, anterior ball bearing; 1-11, positioning sleeve; 1-12, posterior retaining ring; 1-13, posterior ball bearing; 1-14, pulley hub; 1-15, anterior dust-proof washer; 1-16, posterior dust-proof washer.

FIG. 24 is a main (front side) view of a threaded core shaft.

FIG. 25 is a right side view of a threaded core shaft.

FIG. 26 is a main view of a friction spring.

FIG. 27 is a right side view of a friction spring.

FIG. 28 shows a schematic of a friction stopper ring.

FIG. 29 shows a schematic of a friction sliding ring.

FIG. 30 is a right side view of a friction sliding ring.

FIG. 31 shows a schematic of a retaining ring.

FIG. 32 is a plan of a retaining ring.

EMBODIMENTS

Figure 1:
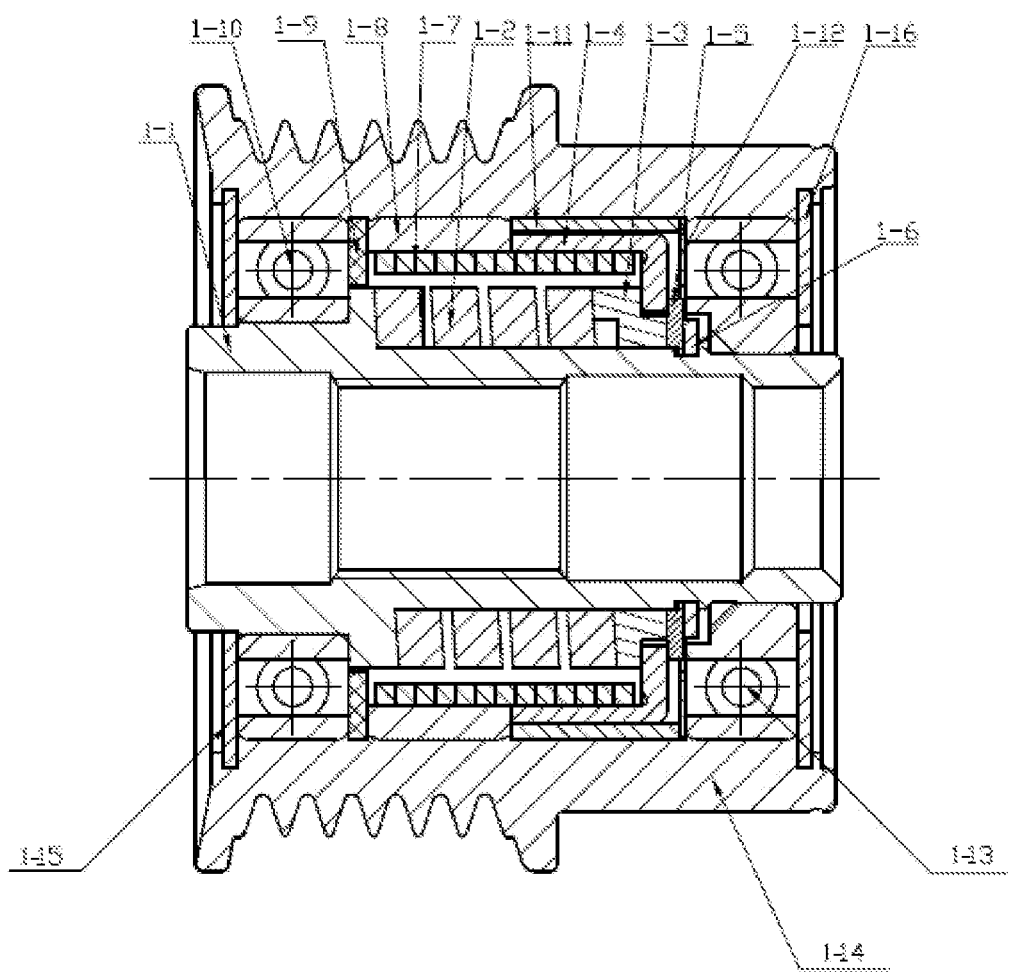
FIG. 1 shows a schematic of a unidirectional coupling damping pulley using spring friction for braking according to embodiment 1.
Figure 2:
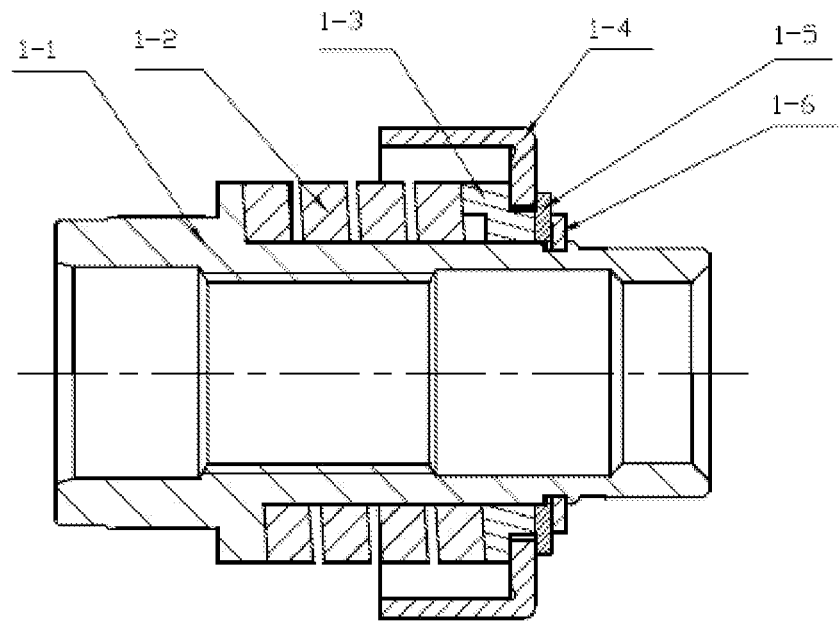
FIG. 2 shows a schematic of a spring damping mechanism.

The embodiments of the present invention is described in detail with drawings as follows.

Embodiment 1

As shown in FIGS. 1-19, a unidirectional coupling damping pulley using spring friction for braking in the present embodiment comprises a threaded core shaft 1-1, a damping spring 1-2, a damping washer 1-3, a friction sliding ring 1-4, a washer 1-5, a square wire snap ring 1-6, a friction spring 1-7, a friction stopper ring 1-8, an anterior retaining ring 1-9, an anterior ball bearing 1-10, a positioning sleeve 1-11, a posterior retaining ring 1-12, a posterior ball bearing 1-13, a pulley hub 1-14, an anterior dust-proof washer 1-15, and a posterior dust-proof washer 1-16.

A damping spring mechanism is arranged in an inner bore of the pulley hub 1-14. The damping spring mechanism comprises a threaded core shaft 1-1, a damping spring 1-2, a damping washer 1-3, a friction moving sleeve 1-4, a washer 1-5, a square wire snap ring 1-6. A protruding ring 1-1-6 with a helicoid surface is formed on one end of the outer diameter 1-1-1 of the threaded core shaft 1-1. The helicoid surface faces the other end. A step 1-1-2 is formed on the helicoid surface. A circle of groove 1-1-3 is formed on the other end of the outer diameter 1-1-1. Two ends of the threaded core shaft 1 are outer diameters (peripheries) 1-1-4 and 1-1-5, respectively, wherein the outer diameter 1-1-4 is adjacent to the protruding ring 1-1-6, and the outer diameters 1-1-4 and 1-1-5 are smaller than the diameter of the protruding ring 1-1-6.

The outer diameter 1-1-1 of the threaded core shaft 1-1 is sleeved with a damping spring 1-2. The damping spring is formed by winding a square wire steel wire. A square steel wire has the advantages of large elastic torque and small volume. One end 1-2-1 of the damping spring 1-2 abuts the helicoid surface of the protruding ring 1-1-6 of the spiral core shaft, and the end surface 1-2-2 of said end of the damping spring 1-2 abuts the step 1-1-2 of the threaded core shaft 1-1. The other end 1-2-3 of the damping spring 1-2 is provided with a damping washer 1-3. The damping washer 1-3 is sleeved around the threaded core shaft 1-1. The damping washer has a helicoid surface 1-3-3. The helicoid 1-3-3 abuts and fits a helicoid 1-2-4 of the damping spring 1-2. A step 1-3-1 is also formed on the damping washer 1-3, which abuts the end surface of said end 1-2-3 of the damping spring. The outer diameter of the damping washer 1-3 has two opposite planes 1-3-2.

A portion of the friction sliding ring 1-4 is in the shape of a circular ring, while the other portion is bent inwards by 90 degrees. The bent portion has a through bore, and planes 1-4-1 are formed in two opposite positions of the inner wall of the through bore. The outer surface 1-3-2 of the damping washer 1-3 is provided with the friction sliding ring 1-4. The two protruding parts 1-4-1 of the friction sliding ring 1-4 are fitted with the two planes 1-3-2 on the outer diameter of the damping washer 1-3 respectively. Plane 1-3-4 of the damping washer 1-3 is provided with a washer 1-5, and the washer 1-5 abuts a side surface of the friction sliding ring 1-4. The other side of the washer 1-5 is provided with a square wire snap ring 1-6. The inner diameter of the square wire snap ring 1-6 is clamps into a groove 1-1-3 of the threaded core shaft 1-1. A spring damping mechanism is thus assembled. See FIG. 2.

Figure 3:
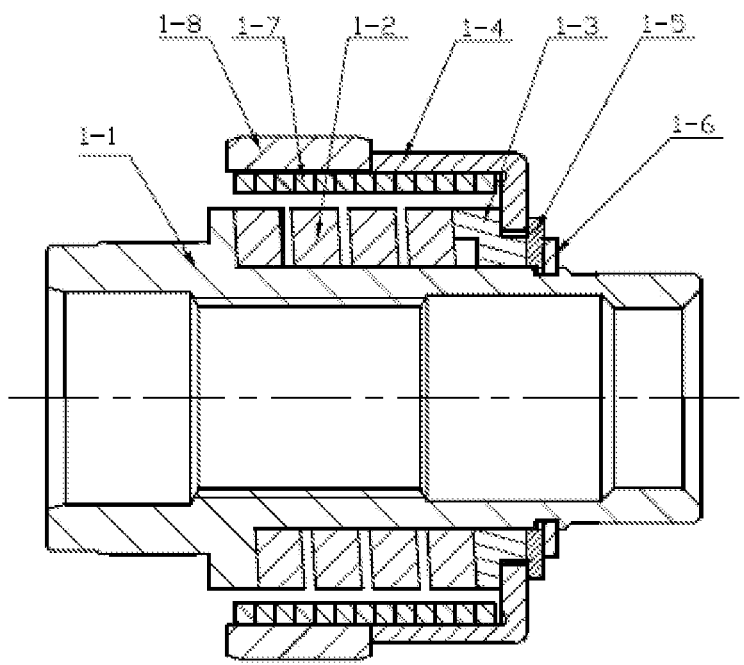
FIG. 3 shows a schematic of a spring friction clutch mechanism.
Figure 4:
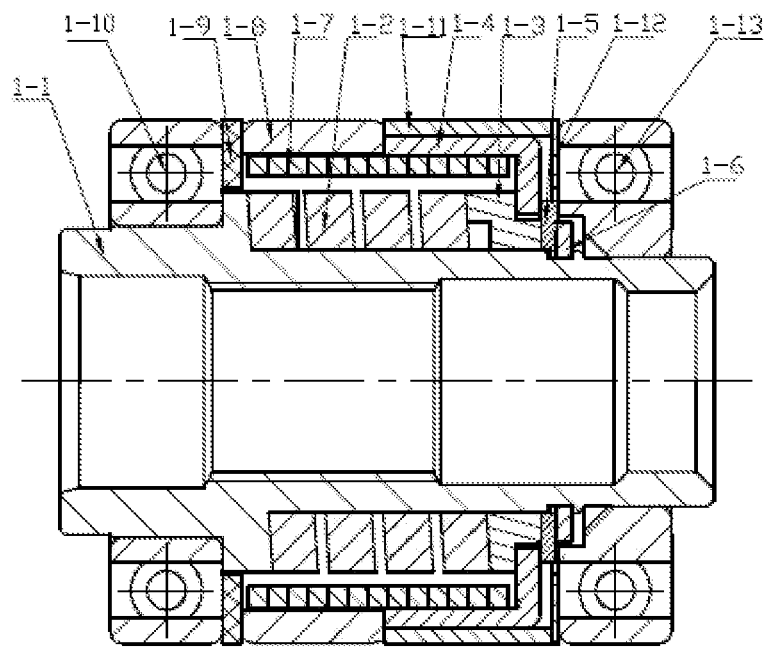
FIG. 4 shows a schematic of a unidirectional coupling damping mechanism using spring friction for braking.
Figure 5:
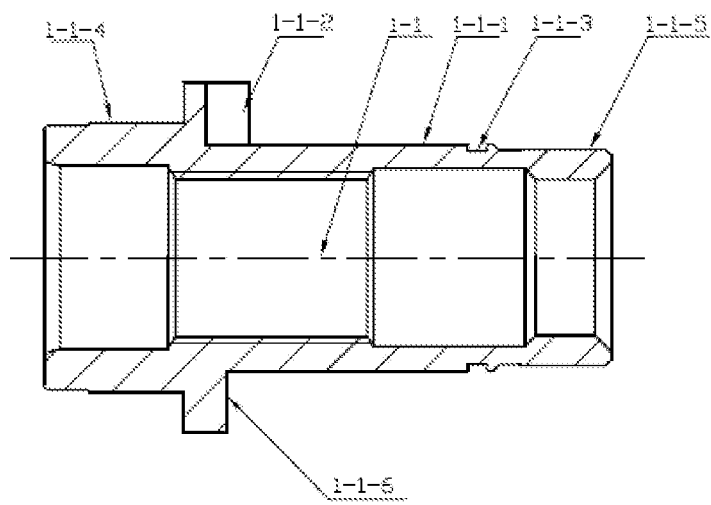
FIG. 5 shows a schematic of a threaded core shaft.
Figure 6:
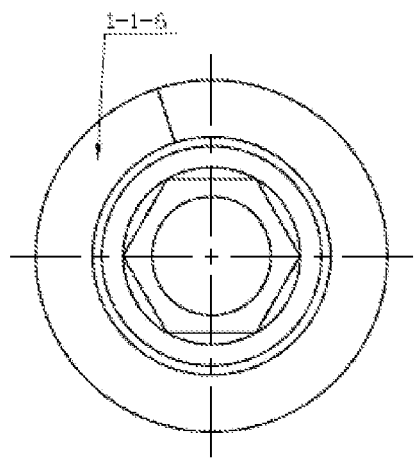
FIG. 6 is a right side view of FIG. 5.
Figure 7:
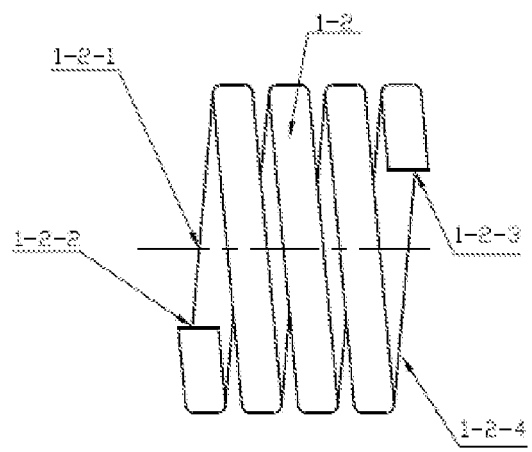
FIG. 7 shows a schematic of a damping spring.
Figure 8:
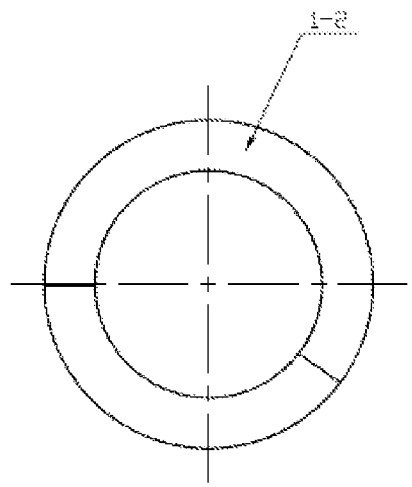
FIG. 8 is a left side view of FIG. 7.
Figure 9:
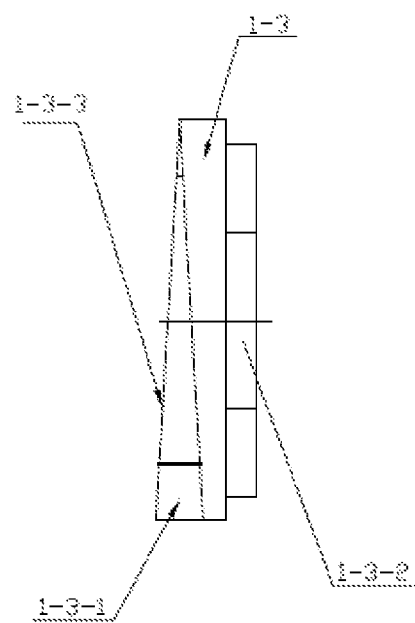
FIG. 9 shows a schematic of a damping washer.
Figure 10:
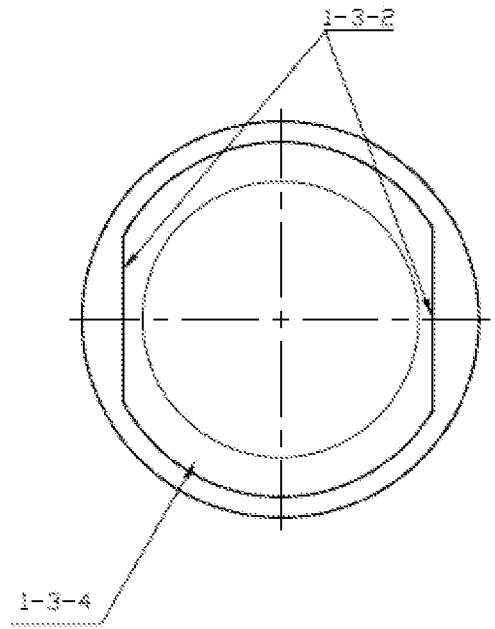
FIG. 10 is a left side view of FIG. 9.
Figure 11:
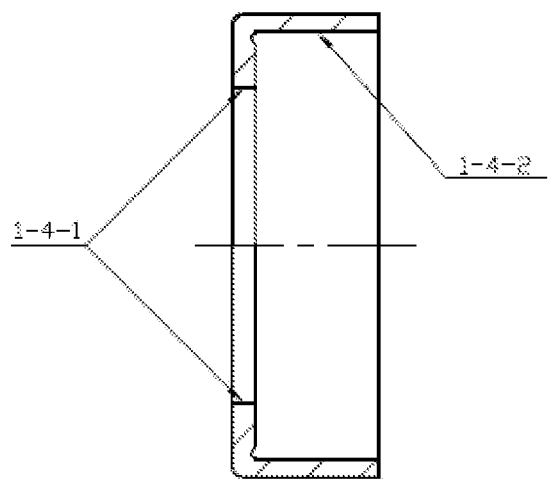
FIG. 11 shows a schematic of a friction sliding ring.
Figure 17:
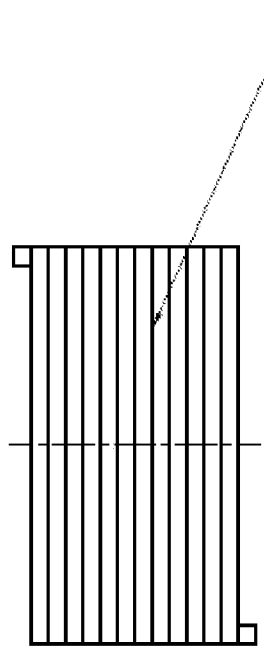
FIG. 17 shows a schematic of a friction spring.
Figure 18:
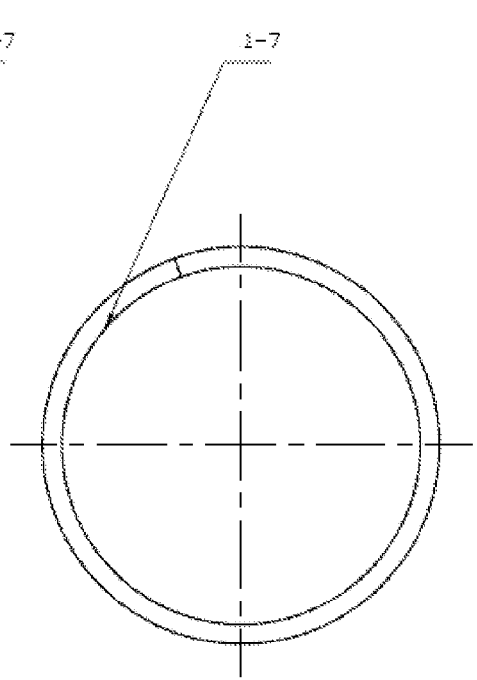
FIG. 18 is a left side view of FIG. 17.
Figure 19:
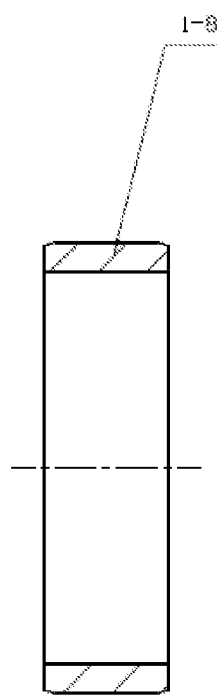
FIG. 19 shows a schematic of a friction stopper ring.
Figure 20:
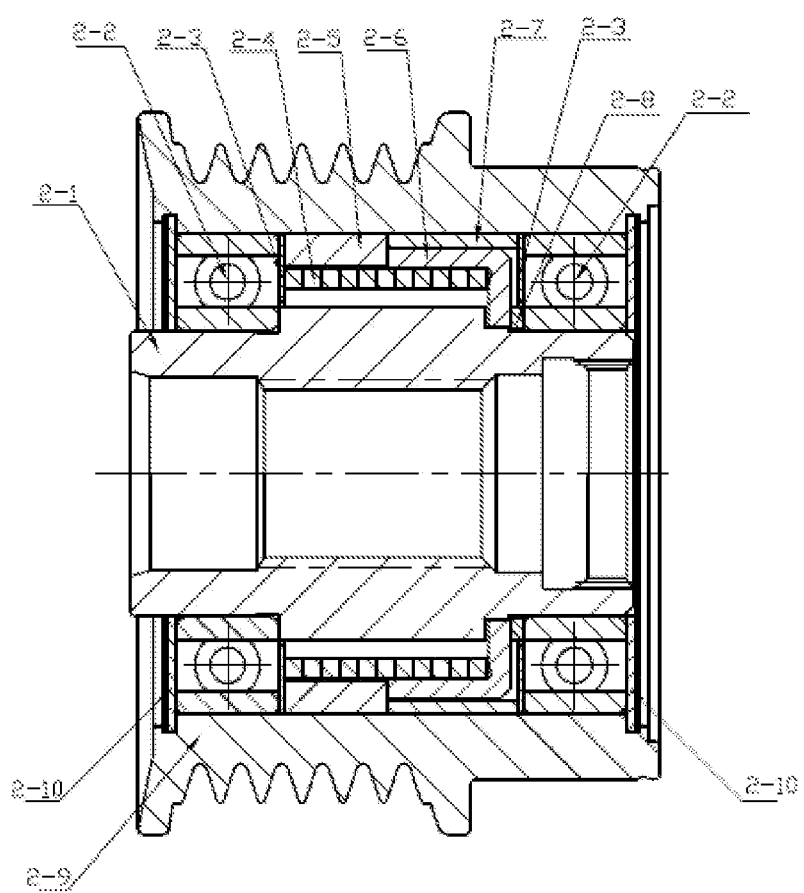
FIG. 20 shows a schematic of a unidirectional pulley that uses spring friction for clutch according to embodiment 2.
Figure 21:
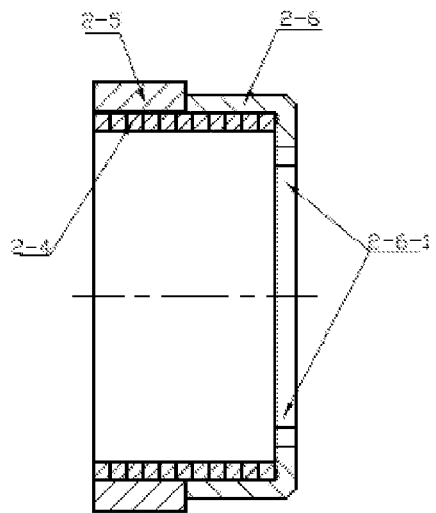
FIG. 21 shows a schematic of a spring friction clutch mechanism according to embodiment 2.
Figure 22:
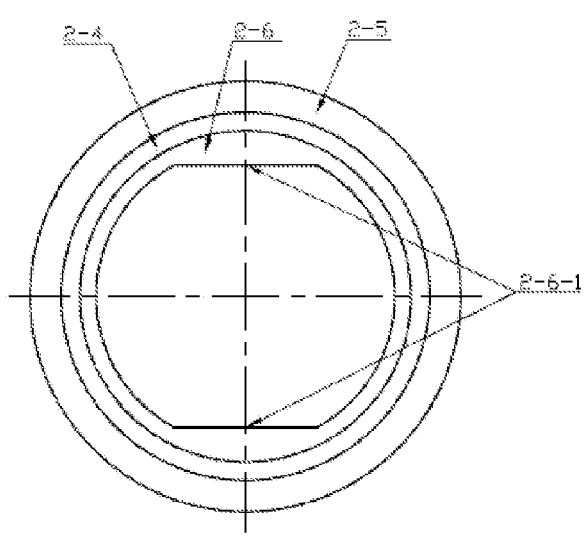
FIG. 22 is a right side view of FIG. 2.
Figure 23:
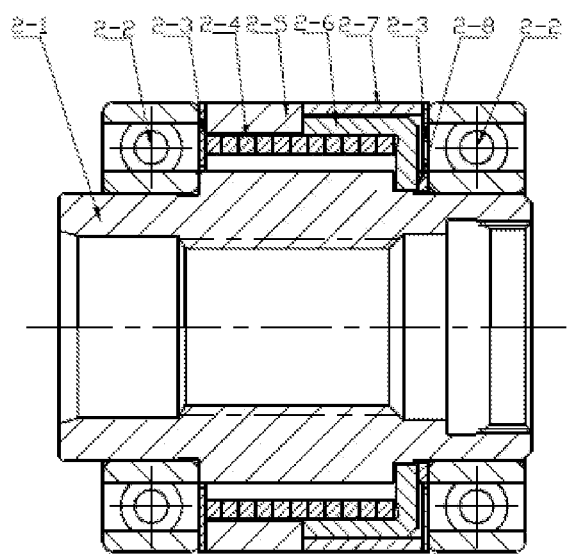
FIG. 23 shows a schematic of a unidirectional spring friction clutch assembly.
Figure 33:
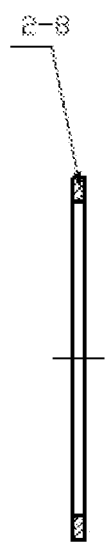
FIG. 33 shows a schematic of a positioning washer.
Figure 34:
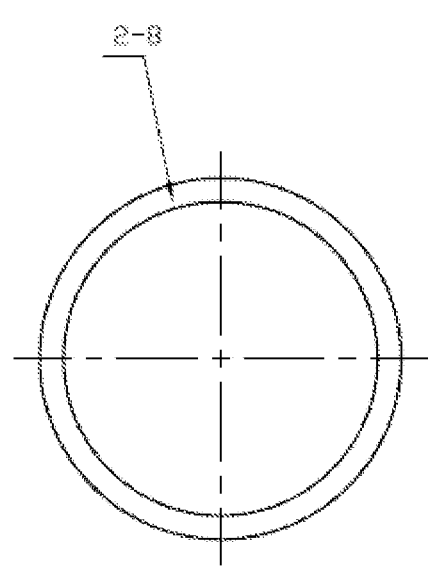
FIG. 34 is a plan of a positioning washer.

As shown in FIG. 3, on the basis of the damping spring mechanism, one end of the outer diameter of the friction spring 1-7 is arranged in the inner bore 1-4-2 of the friction sliding ring 1-4, and the other end of the outer diameter of the friction spring is arranged in a friction stopper ring 1-8; the friction stopper ring 1-8 abuts an end surface of the friction sliding ring 1-4, thus forming a spring friction clutch mechanism. A high and low temperature grease is provided to the inner diameter of the friction spring so as to lubricate the rolling of the contact parts.

The other end plane of the friction stopper ring 1-8 is provided with an anterior retaining ring 1-9; the anterior retaining ring 1-9 is just located outside the protruding ring 1-1-6 of the threaded core shaft 1-1; the other end plane of the anterior retaining ring 1-9 is provided with an anterior ball bearing 1-10; the anterior ball bearing 1-10 is located outside the outer diameter 1-1-4 of the threaded core shaft 1-1, and the inner bore of the anterior ball bearing is pressed on the outer diameter 1-1-4 of the threaded core shaft 1-1; the outer diameter of the friction sliding ring 1-4 is sleeved and in clearance fit with a positioning sleeve 1-11; the friction sliding ring 1-4 can slide freely inside the inner diameter of the positioning sleeve 1-11; the posterior end plane of the positioning sleeve 1-11 is provided with a posterior retaining ring 1-12; the posterior retaining ring 1-12 is located outside a portion of the washer 1-5 and in clearance fit with the washer; the other plane of the posterior retaining ring 1-12 is provided with a ball bearing 1-13; the inner diameter of the ball bearing 1-13 is pressed against the outer diameter 1-1-5 of the threaded core shaft 1-1. A unidirectional coupling damping mechanism with spring friction braking is thus formed. See FIG. 4.

The unidirectional coupling damping mechanism using spring friction for braking is pressed into an inner bore of the pulley hub 1-14, that is, the outer diameters of the ball bearings 1-10 and 1-13 on the two ends respectively, the anterior retaining ring 1-9, the outer diameter of the friction stopper ring 1-8, the outer diameter of the positioning sleeve 1-11 and the outer diameter of the posterior retaining ring 1-12 are all pressed against the inner wall of the pulley hub 1-14; thereafter, the anterior end plane of the anterior ball bearing 1-10 is provided with an anterior dust-proof washer 1-15; the posterior end plane of the posterior ball bearing 1-13 is provided with a posterior dust-proof washer 1-16. Both the anterior and posterior dust-proof washers are in clearance fit with the outer diameter of the threaded core shaft 1-1. A unidirectional coupling damping pulley using spring friction for braking is thus assembled.

The outer diameters of the anterior and posterior ball bearings are in close fit with the inner diameter of the pulley hub 1-14, and the inner bores of the two ball bearings are in close fit with the two ends of the threaded core shaft 1-1, in order to support radial load. The posterior end surface of the posterior ball bearing 1-13 is provided with a dust-proof washer 1-16, and the anterior end surface of the anterior ball bearing 1-10 is provided with an anterior dust-proof washer 1-15. The outer diameters of the two dust-proof washers are both pressed against the inner wall of the pulley hub 1-14. The inner diameters of the two dust-proof washers are both in clearance fit with the outer diameter of the threaded core shaft 1-1.

Both the inner diameter of the friction stopper ring 1-8 and the inner diameter of the friction sliding ring 1-4 are smaller than the outer diameter of the friction spring 1-7, increasing the elastic tension of the outer diameter of the friction spring. The two ends of the friction spring 1-7 are not fixed on any component. The friction spring 1-7, the friction stopper ring 1-8 and the friction sliding ring 1-4 are locked up through friction, transmitting power in free state and interrupting power transmission thereby. When either of the inner bore of the friction stopper ring 1-8 and the inner bore of the friction sliding ring 1-4 has a higher smoothness, the friction spring 1-7 rotates within that particular ring in free state. The two ends of the friction spring 1-7 can be separated from the friction stopper ring 1-8 and the friction sliding ring 1-4 alternately. Thus, the friction spring may not easily break, and its service life is therefore lengthened.

When the direction of torsion on the friction stopper ring 1-8 and the friction sliding ring 1-4 is opposite to the coiling direction of the friction spring 1-7, the outer diameter of the friction spring 1-7 undergoes a dilation force, causing friction with the inner diameters of the friction stopper ring 1-8 and the friction sliding ring 1-4 and thereby locking up therewith. When the direction of torsion on the friction stopper ring 1-8 and the friction sliding ring 1-4 is parallel to the coiling direction of the friction spring 1-7, the outer diameter of the friction spring 1-7 contracts, releasing the friction with the inner diameters of the friction stopper ring 1-8 and the friction sliding ring 1-4, thus reaching a free state and interrupting the power transmission.

When an automobile generator is driven by a crankshaft, the torque is transferred to a spring friction clutch pulley via a belt, using the switch function between power transmission and interruption of torque that is intrinsic in the friction spring 1-7. When the direction of the force exerted on the outer diameter of the friction spring 1-7 is opposite to the coiling direction of the friction spring 1-7, the outer diameter of the friction spring 1-7 expands and generates friction with the inner walls of the friction stopper ring 1-8 and the friction sliding ring 1-4, thus reaching lock-up, so that the torque is transferred from the belt to the pulley hub 1-14, then to the friction stopper ring 1-8, then to the friction spring 1-7, then to the friction sliding ring 1-4, then to the damping washer 1-3, and then to the damping spring 1-2. Since the helicoid 1-3-3 of the damping washer 1-3 abuts the helicoid 1-2-1 of the damping spring 1-2, and the step 1-3-1 of the damping washer 1-3 abuts the end surface 1-2-3 of the damping spring 1-2, when the damping spring 1-2 is subject to an external force and the torsion direction is opposite to the coiling direction of the damping spring 1-2, the damping spring 1-2 expands and generates elasticity, buffering the transient torque impulse caused by the external force. The torque is then transferred to the threaded core shaft 1-1, and eventually the rotors of the generator are driven by the threaded core shaft 1-1. When the rotation of the pulley hub 1-14 decelerates, the inertia rotational speed of the rotors of the generator surpasses the rotational speed of the pulley hub 1-14. In this case, the helicoid of the protruding ring 1-1-6 of the threaded core shaft 1-1 rotates towards the helicoid 1-2-1 of the damping spring 1-2, rendering the damping spring 1-2 compressed axially. When there is no clearance for compression, the damping spring 1-2 drives the damping washer to rotate, and eventually drives the friction sliding ring 1-4 to rotate. In this case, the rotating direction of the friction sliding ring 1-4 is parallel to the coiling direction of the friction spring 1-7. The outer diameter of the friction spring 1-7 contracts, releasing the friction and thus reaching a free state, and the rotors of the generator can rotate freely by inertia.

Embodiment 2

As shown in FIGS. 20-34, a unidirectional pulley using spring friction clutch for braking in the present embodiment comprises a threaded core shaft 2-1, ball bearings 2-2, retaining rings 2-3, a friction spring 2-4, a friction stopper ring 2-5, a friction sliding ring 2-6, a positioning sleeve 2-7, a positioning washer 2-8, a pulley hub 2-9, and dust-proof washers 2-10.

A spring friction clutch mechanism is arranged in the pulley hub 2-9. The mechanism comprises a friction spring 2-4, a friction stopper ring 2-5, a friction sliding ring 2-6. See FIG. 21. The friction stopper ring 2-5 is the shape of a circular ring. A portion of the friction sliding ring 2-6 is in the shape of a circular ring, and the other portion of the friction sliding ring is bent inwards by 90 degrees and provided with a through bore. The shape of the bore is a circle with two opposite bow-like segments removed. The inner edge of each segment is a plane 2-6-1. The inner diameter of the friction stopper ring 2-5 equals the inner diameter of the circular portion of the friction sliding ring 2-6, and an end surface of the friction stopper ring abuts an end surface of the circular portion of the friction sliding ring. An end of the outer diameter of the friction spring 2-4 is arranged in the inner bore of the circular portion of the friction sliding ring 2-6, and the other end is arranged in the inner bore of the friction stopper ring 2-5, thus forming a spring friction clutch mechanism. The inner diameters of the friction stopper ring 2-5 and friction sliding ring 2-6 are both slightly smaller than the outer diameter of the friction spring 2-4, increasing the elastic tension of the outer diameter of the friction spring 2-4. The two ends of the friction spring 2-4 are not fixed on any component. The friction spring 2-4, the friction stopper ring 2-5 and the friction sliding ring 2-6 are locked up through friction, transmitting power in free state and interrupting the power transmission thereby. When either of the inner bores of the friction stopper ring 2-5 and the friction sliding ring 2-6 has a higher smoothness, the friction spring 2-4 rotates within that particular circle in free state. The two ends of the friction spring 2-4 can be separated with the friction stopper ring 2-5 and the friction sliding ring 2-6 alternately. Thus, the friction spring 2-4 may not easily cracked, and its service life is therefore lengthened.

The diameter of the middle portion of the threaded core shaft 2-1 is greater than the diameters of its two ends. The outer diameter of the anterior end of the threaded core shaft 2-1 is provided with a ball bearing 2-2. The inner side surface of the ball bearing 2-2 is provided with a retaining ring 2-3 (a clearance is reserved between the retaining ring 2-3 and the outer diameter of the threaded core shaft 2-1). The retaining ring 2-3 aligns with the anterior step of the threaded core shaft 2-1. The above-mentioned spring friction clutch mechanism is then provided. A clearance is reserved between the inner diameter of the friction spring 2-4 and the outer diameter of the threaded core shaft 2-1. Within the spring friction clutch mechanism, two planes 2-6-1 in the inner bore of the friction sliding ring 2-6 are respectively fitted with two recessed planes 2-1-1 of the outer circle on the other end of the threaded core shaft 2-1. The outer diameter of the friction sliding ring 2-6 is sleeved with a positioning sleeve 2-7, and a clearance is reserved therebetween. An end surface of the positioning sleeve 2-7 abuts an end of the friction stopper ring 2-5. The other end surface of the positioning sleeve is provided with a posterior retaining ring 2-3. The posterior retaining ring 2-3 is located on a side of the bent portion of the friction sliding ring 2-6 (facing the posterior end of the threaded core shaft 2-1). A positioning washer 2-8 is arranged in the inner diameter of the posterior retaining ring 2-3. The positioning washer 2-8 clamps on the threaded core shaft 2-1. The positioning washer locates the bent portion of the friction sliding ring 2-6 on the threaded core shaft 2-1 in the transverse direction (the inner side of the friction sliding ring 2-6 abuts the step of the posterior end of the threaded core shaft 2-1). A clearance is reserved between the posterior retaining ring 2-3 and the positioning washer 2-8.

The posterior end of the threaded core shaft 2-1 is then provided with another ball bearing 2-2. The inner diameter of the ball bearing 2-2 is tightly pressed against the posterior outer diameter of the threaded core shaft 2-1. The inner side surface of the ball bearing 2-2 abuts the posterior retaining ring 2-3 and the positioning washer 2-8. A unidirectional clutch assembly is formed thereby.

The outer diameter of the aforementioned unidirectional clutch assembly is pressed against the inner diameter of the pulley hub 2-9, that is, the outer circles of the ball bearings 2-2, the outer circles of the retaining rings 2-3, the outer circle of the friction stopper ring 2-5 and the outer circle of the positioning sleeve are all pressed against the inner circle of the pulley hub 2-9; thereafter, two dust-proof washers 2-10 are provided on the outer side surfaces of the anterior and the posterior ball bearings 2-2. The outer circles of the two dust-proof washers 2-10 are pressed against the inner circle of the pulley hub 2-9, and the inner circles of the dust-proof washers are in clearance fit with the outer circle of the threaded core shaft 2-1, or vice versa, that is, the outer circles of the two dust-proof washers 2-10 are in clearance (rotation) fit with the inner circle of the pulley hub 2-9, and the inner circles of the dust-proof washers are in close fit with the outer circle of the threaded core shaft 2-1.

When assembling, a ball bearing 2-2 is provided at the step on the anterior portion of the threaded core shaft 2-1; a retaining ring 2-3 is arranged on the inner side of the ball bearing 2-2, and thereafter the threaded core shaft 2-1 is sleeved with the spring friction clutch mechanism; a side plane of the friction stopper ring 2-5 that is within the spring friction clutch mechanism abuts a plane of the retaining ring 2-3; two planes 2-1-1 in the outer wall of the middle portion of the threaded core shaft 2-1 fit with two planes 2-6-1 in an inner bore of the friction sliding ring; the friction sliding ring 2-6 is sleeved with a positioning sleeve 2-7, and the inner bore of the positioning sleeve 2-7 is wider than the outer diameter of the friction sliding ring 2-6 so that the friction sliding ring 2-6 can rotate within the inner diameter of the positioning sleeve 2-7; a posterior retaining ring 2-3 is arranged on a plane of the other side of the positioning sleeve 2-7, and a positioning washer 2-8 is arranged in the inner bore of the posterior retaining ring 2-3; thereafter, another ball bearing 2-2 is pushed in from the posterior end of the threaded core shaft 2-1 with the inner bore of ball bearing against the outer diameter of the threaded core shaft, and the ball bearing abuts a plane of the posterior retaining ring 2-3 and a plane of the positioning washer 2-8, thus forming a unidirectional clutch assembly. The outer diameter of the unidirectional clutch assembly is pressed against the inner diameter of the pulley hub 2-9, and two dust-proof washers are provided on the outer side surfaces of the anterior and the posterior ball bearings 2-2.

When the direction of torsion on the friction stopper ring 2-5 and the friction sliding ring 2-6 is opposite to the coiling direction of the friction spring 2-4, a dilation force emerges in the outer diameter of the friction spring 2-4, causing the friction spring to lock up with the friction stopper ring 2-5 and the friction sliding ring 2-6 through friction between the outer diameter of the friction spring and the inner diameters of the friction stopper ring and the friction sliding ring. When the direction of torsion on the friction stopper ring 2-5 and the friction sliding ring 2-6 is parallel to the coiling direction of the friction spring 2-4, the outer diameter of the friction spring 2-4 contracts, releasing the friction between the outer diameter of the friction spring and the inner diameters of the friction stopper ring 2-5 and the friction sliding ring 2-6, thus reaching a free state and interrupting the power transmission. A high and low temperature grease is provided to the inner diameter of the friction spring 2-4 to lubricate the rolling at the contact position.

The unidirectional coupling damping pulley for automobile generators in the present invention has advantages such as simplicity of structure, long service time, easy process of manufacture, and low cost of manufacture.

A person of ordinary skill in the art should recognize that the above embodiments are only for the purpose of explaining the present invention but not a limitation to the present invention. Any derivative or variant of the above embodiments falls in the protection scope of the present invention as long as they are substantially within the scope of the present invention.

What is claimed is:
1. A unidirectional coupling damping pulley that uses spring friction for braking, comprising:
   a threaded core shaft,
   a damping spring,
   a friction spring,
   a friction stopper ring,
   a friction sliding ring,
   a damping washer,
   ball bearings,
   a positioning sleeve, and
   a pulley hub;
      wherein the threaded core shaft extends into the pulley hub;
      wherein the two ends of the threaded core shaft and the pulley hub are, respectively, provided with a ball bearing;
      wherein the friction stopper ring and the positioning sleeve are pressed against an inner wall of the pulley hub;
      the pulley is characterized in that:
         a protruding ring is formed on an outer diameter of the threaded core shaft, and a step is provided on a side of the protruding ring toward the other side of the threaded core shaft;
         wherein the other side of the threaded core shaft opposite the protruding ring is sleeved with the damping washer, and a step is formed on the damping washer;
         the threaded core shaft is sleeved with the damping spring;
         a first end of the damping spring abuts the protruding ring of the threaded core shaft, and the end surface of said end of the damping spring abuts the step of the protruding ring;
         a second end of the damping spring abuts the damping washer, and the end surface of said end of the damping spring abuts the step of the damping washer;
         the damping washer is sleeved with the friction sliding ring and can rotate synchronously with the friction sliding ring; the friction spring is sleeved around the damping spring;
         one end of the outer diameter of the friction spring is arranged in an inner bore of the friction sliding ring, and the other end of the outer diameter of the friction spring is arranged in the friction stopper ring;

the outer wall of the friction sliding ring is in clearance fit with the positioning sleeve; both the inner diameter of the friction stopper ring and the inner diameter of the friction sliding ring are smaller than the outer diameter of the friction spring, increasing the elastic tension of the friction spring;

the friction spring locks up with the friction stopper ring and the friction sliding ring through friction, and the friction spring is configured to be separated from the friction stopper ring and the friction sliding ring alternately.

2. The unidirectional coupling damping pulley of claim 1, wherein the side surface of the protruding ring of the threaded core shaft which abuts the damping spring is a helicoid.

3. The unidirectional coupling damping pulley of claim 2, wherein the side surface of the damping washer which abuts damping spring is a helicoid.

4. The unidirectional coupling damping pulley of claim 2, wherein a circle of groove is formed on the threaded core shaft; the threaded core shaft is sleeved with a washer which is disposed on the outer side surfaces of the damping washer and the friction sliding ring; a square wire snap ring is provided on the outer side surface of the washer, and the inner diameter of the square wire snap ring clamps into the groove of the threaded core shaft.

5. The unidirectional coupling damping pulley of claim 2, wherein corresponding planes which fit together are respectively formed in the outer diameter of the damping washer and in the inner wall of the friction sliding ring so as to enable synchronous rotation.

6. The unidirectional coupling damping pulley of claim 2, wherein a retaining ring is provided on the outer side surface of the friction stopper ring; the retaining ring is in clearance fit with threaded core shaft, and the retaining ring is pressed against the inner wall of the pulley hub.

7. The unidirectional coupling damping pulley of claim 1, wherein the side surface of the damping washer which abuts damping spring is a helicoid.

8. The unidirectional coupling damping pulley of claim 1, wherein a circle of groove is formed on the threaded core shaft; the threaded core shaft is sleeved with a washer which is disposed on the outer side surfaces of the damping washer and the friction sliding ring; a square wire snap ring is provided on the outer side surface of the washer, and the inner diameter of the square wire snap ring clamps into the groove of the threaded core shaft.

9. The unidirectional coupling damping pulley of claim 8, wherein a retaining ring is provided on the outer side surface of the positioning sleeve; the inner diameter of the retaining ring is in clearance fit with the outer diameter of the washer, and the retaining ring is pressed against the inner wall of the pulley hub.

10. The unidirectional coupling damping pulley of claim 1, wherein corresponding planes which fit together are respectively formed in the outer diameter of the damping washer and in the inner wall of the friction sliding ring so as to enable synchronous rotation.

11. The unidirectional coupling damping pulley of claim 1, wherein a retaining ring is provided on the outer side surface of the friction stopper ring; the retaining ring is in clearance fit with threaded core shaft, and the retaining ring is pressed against the inner wall of the pulley hub.

12. The unidirectional coupling damping pulley of claim 1, wherein the outer side surfaces of the ball bearings are respectively provided with a dust-proof washer; the dust-proof washer is in clearance fit with the outer diameter of the threaded core shaft, and the dust-proof washer is pressed against the inner wall of the pulley hub.

13. The unidirectional coupling damping pulley of claim 1, wherein the cross-section of the damping spring is square.

\* \* \* \* \*